March 29, 1966 F. L. DAVIS 3,243,233
ADJUSTABLE SAFETY BELT
Filed Dec. 3, 1963
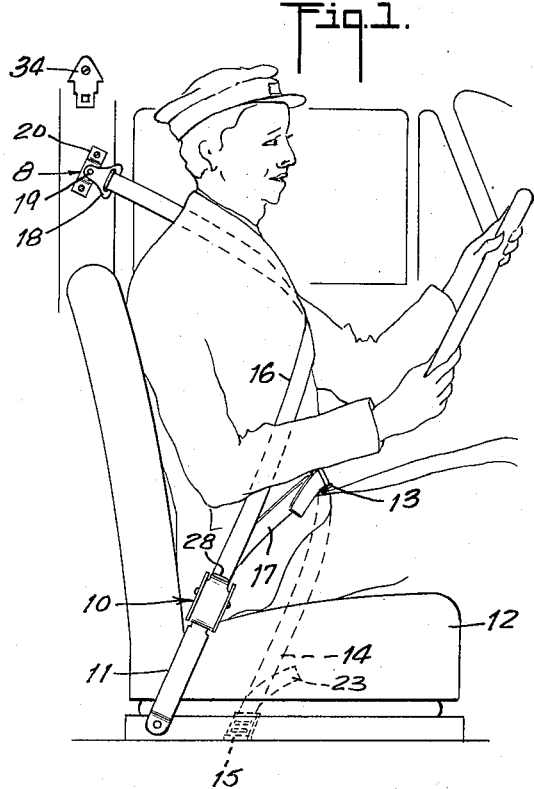
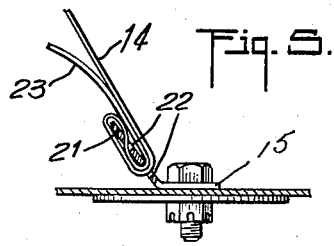
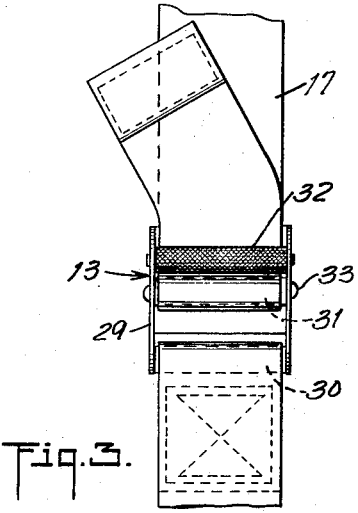
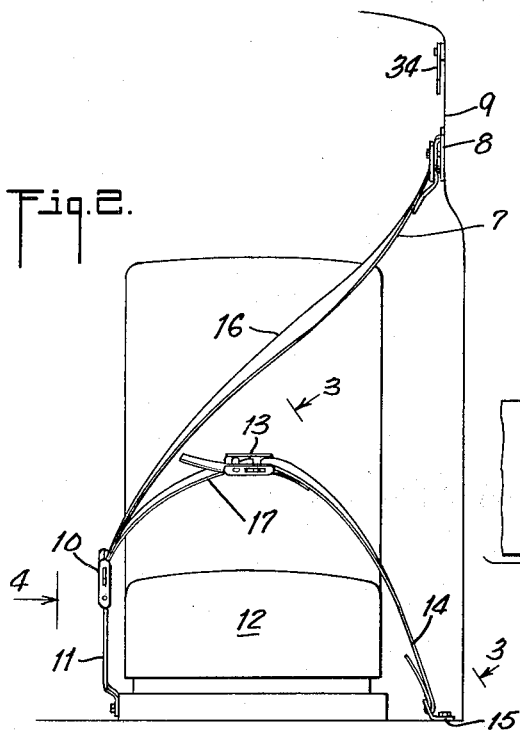
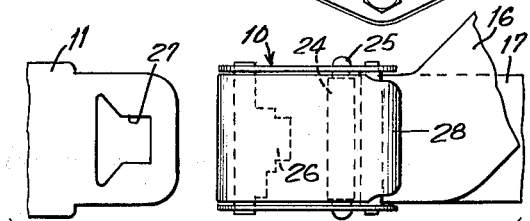
INVENTOR.
FRANK L. DAVIS
BY
ATTORNEY United States Patent Office 3,243,233
Patented Mar. 29, 1966

3,243,233
ADJUSTABLE SAFETY BELT
Frank L. Davis, 30 Mariners Lane, Northport,
Long Island, N.Y.
Filed Dec. 3, 1963, Ser. No. 327,751
1 Claim. (Cl. 297—389)

The invention herein disclosed relates to safety belts of the combined shoulder harness and seat belt type, attached at the opposite ends to the frame or body of the car.

Special objects of the invention are to provide quick and easy length adjustment of the seat belt portion and to provide quick and easy release of this portion under conditions for example, requiring the driver to reach in the pockets for the change to cover road tolls, or the like.

Further special objects of the invention are to provide for location of the seat belt adjustment in the most convenient position for release by the driver and to accomplish this and the foregoing purposes with simple inexpensive and practical construction.

Other desirable objects and the novel features of construction, combination and relation of parts by which all such objects are accomplished are set forth and will appear in the course of the following specification.

The drawings accompanying and forming part of the specification illustrate a present commercial embodiment of the invention, but structure may be modified and changed as regards the immediate illustration, all within the true intent and scope of the invention as hereinafter defined and claimed.

FIG. 1 in the drawing is a diagrammatic view illustrating the combined shoulder harness and seat belt combination installed and in use.

FIG. 2 is a front elevation of the same.

FIG. 3 is a side view of the belt adjustment buckle and the floor anchorage connection therefor, as on substantially the plane of line 3—3 of FIG. 2.

FIG. 4 is a broken plan view of the quick release and shoulder strap adjustment buckle and anchorage, looking in the direction of arrow 4 in FIG. 2.

FIG. 5 is a broken sectional detail of the adjustable floor anchorage for the lap or seat belt section.

FIGS. 1 and 2 show the shoulder and seat belt sections as combined in a single continuous length of webbing 7, attached at the upper end at 8, to an adjoining portion 9, of the frame of the car, in position to extend downwardly over the chest of the driver, in a loop, through a quick release, web adjustment buckle 10, attached to a floor or frame anchorage 11, at the inner side of the seat 12, and thence through a length adjustment buckle 13, secured to the floor at the outer side of the seat by a length of webbing 14, adjustably connected to a floor or frame anchorage 15.

The length of webbing 16, between the upper frame anchorage 8, and the quick release length adjustable buckle 10, may be considered as the harness section of the webbing and that portion 17, plus webbing 14, between the release buckle and floor anchorage 15, as the seat, lap, hip or body portion of the belt.

The upper anchorage 8, is shown as a fixed point with the webbing secured to a yoke 18, pivoted at 19, on a bracket 20, bolted to the frame in back of and at a height above the normal shoulder position.

While shown as a fixed attachment, this anchorage may provide for a length adjustment of the webbing by a construction similar to the floor anchorage 15, FIGS. 2 and 5, consisting of an angled bracket 21, slotted at 22, for overlapping, interlocking, binding reverse passage of the webbing.

This construction, as will be apparent in FIG. 1, in either location provides a free end 23, of the webbing which, with release of tension, may be manipulated to adjust the length of webbing extending from the anchorage.

The quick release and harness adjustment buckle 10, may be the same as or of similar construction to that disclosed in Patent 3,091,010 of May 28, 1963, in which the webbing is looped about a clamping roll 24, FIG. 4, which can be shifted at 25, to release the grip on the webbing for length adjustment and which has a latch member 26, engageable in an opening 27, in the anchorage element 11, which can be released by lifting the handle cover 28.

On releasing clamping pressure of this buckle on the webbing, the length of the chest strap may be adjusted to suit the driver and for quick release of both chest harness and seat belt, it is only necessary to lift the cover 28, of the buckle.

The anchorage 11, for this buckle may be a short length of strap metal bolted to the floor or frame and having the end shaped as shown in FIG. 4, for releasable interlocking engagement in the end of the buckle.

The seat belt length adjusting buckle 13, as shown in FIG. 3, may be in the form of a frame 29, having the length of anchorage webbing 14, secured over a roll or pin 30, in one end of the frame and having the seat belt webbing 17, looped about a clamping roll 31, slidable in the frame in respect to a fixed roll 32, and shiftable to release the webbing by fingerholds 33, exposed at opposite ends of said clamping roll.

This tension relieving or slack take-up length adjustment buckle is made conveniently accessible to the driver by means of the length adjustment anchorage webbing 14, which can be set in the anchorage 15, to locate this buckle in a mid-position or in any other position that may be most convenient and easily reachable by the hands of the driver.

This preliminary setting of the seat belt adjustment buckle may be initially effected and then be left undisturbed by use of this buckle for seat belt length adjustment purposes.

Similarly, after the release buckle 10 is adjusted for shoulder harness purposes, it may be kept at that adjustment regardless of safety belt releasing actions.

Each adjustment may be made independently of the other. The tension of the chest strap may be set to a comfortable holding position without disturbing the seat belt adjustment and the latter may be effected without disturbing the shoulder harness portion.

The upper harness strap section 16 and lower seat belt section 17 may be continuous portions of the same webbing, affording simplicity, low cost and easy handling and both the release buckle and the belt tensioning buckle may be of light-weight, inexpensive construction. The floor and frame anchorages may be of light-weight, low cost construction, readily installed in existing cars.

As a further convenience, a hang-up hook 34, may be mounted on the side of the vehicle above the web anchorage, FIG. 1, to receive and hold the combined webbing when not in use.

The floor anchorage 11 is shown extended up high enough to locate the quick release and harness adjustment buckle in convenient reach at the side of the driver, enabling easy and quick adjustment of the strap portion running down over the chest or immediate release of both this portion and the seat belt portion.

To similar effect, the seat belt adjustment buckle 13 is disposed in the most convenient position for adjustment in front of the driver, so that it can be quickly and easily released without the driver having to reach down between the wall of the car and the side of the seat.

By adjusting the length of the webbing 14 the seat belt buckle 13 may be located in position for most convenient operation so that both hands may be freely used for tightening or loosening the seat belt portion, without affecting the adjustment of the shoulder harness portion 16.

The terms employed herein, such as "web" and "webbing" have been used in a descriptive rather than in a limiting sense, except possibly for limitations as may be imposed by state of the prior art.

What is claimed is:

A quick releasable unitary lap belt and shoulder harness combination with independent separately located length adjustment means for both lap belt and shoulder harness elements, comprising a single length webbing having a shoulder embracing upper portion connected by an intermediate loop in the webbing with a lower lap belt, an upper anchorage for securing the upper end of the webbing to an upper portion of a vehicle, above and in back of the vehicle seat, a floor anchorage at the opposite side of the seat from said upper anchorage, a quick release web gripping buckle having a quickly detachable engagement with said floor anchorage and provided with a web clamping element about which said loop in the webbing is engaged and which is relatively shiftable to release and to effect holding adjustment of the loop and to accordingly fix the effective length of said upper portion of the webbing, a second floor anchorage at the same side of the seat as said upper anchorage, the lower lap belt forming portion of the webbing extending from said loop gripped in said quick release buckle, a lap belt buckle on said extending portion of the lower lap belt forming portion of the webbing located between said first buckle and said second floor anchorage, adjustable to fix the active length of said lap belt forming portion and to slacken this portion independently of the shoulder harness forming portion, a second length of webbing extending between said second buckle and said second floor anchorage, and means adjustably securing said second length of webbing at one end for locating said second lap belt length adjustment buckle in convenient position for adjustment by the user of the harness combination, whereby both the shoulder embracing upper harness portion and the lower lap belt forming portion may be adjusted and secured in adjusted relation independently of each other and the second lap belt length adjusting buckle may be disposed at a convenient position for adjustment without affecting adjustment of the shoulder harness and lap belt forming portions.

References Cited by the Examine

UNITED STATES PATENTS

| | | | |
|---|---|---|---|
| 1,898,090 | 2/1933 | Lethern | 297—389 |
| 3,043,625 | 7/1962 | Bohlin | 297—389 |
| 3,125,376 | 3/1964 | Van Duijvendijk | 297—389 |

FRANK B. SHERRY, *Primary Examiner.*

J. S. PETRIE, R. B. FARLEY, *Assistant Examiners.*